May 6, 1941.    J. L. PRINGLE    2,241,040
MEAT RECTIFIER
Filed March 27, 1940

INVENTOR.
J. L. PRINGLE
BY Albert J. McCauley
ATTORNEY.

Patented May 6, 1941

2,241,040

UNITED STATES PATENT OFFICE 2,241,040

MEAT RECTIFIER

John L. Pringle, West Monroe, La.

Application March 27, 1940, Serial No. 326,138

7 Claims. (Cl. 53—5)

This invention relates to a meat rectifier adapted to overcome or rectify a number of objectionable conditions which exist in the usual methods of cooking meats, at the same time reducing the labor of the cooking operation while saving time as well as fuel and also conserving the flavor of the meat. In using the ordinary cooking utensils, for example, in frying bacon and various other kinds of meat, the heat will cause the meat to curl, twist, buckle or warp into objectionable shapes, which result in improper cooking of parts of the meat, and produce an undesirable distorted condition in the cooked product. Furthermore, these usual conditions require excess fuel for the improper cooking, and a great deal of the desirable flavor is lost, not only because there is a lack of uniformity in cooking various parts of the distorted meat, but also because the vaporized meat juices freely escape to the atmosphere, where they are often regarded as objectionable odors.

In my development of this art, I found that a very remarkable improvement can be obtained by subjecting the meat to the action of a rectifying member which rests upon the top surface of the meat during the cooking operation, thereby retaining the meat in a desirable flat condition, while serving as a closure to prevent free escape of moisture and vapors from the meat.

Advantages are gained by a rectifying member made of metal or other opaque material, but a very substantial improvement appears in a device of this kind made of transparent material. In using an opaque rectifying member it is necessary to occasionally lift it from the meat to observe the progress of the cooking operation, the meat being turned while the rectifying member is separated from the cooking zone. Such interruptions of the cooking process involve time and labor, as well as a loss of fuel, and some of the flavor is lost in the vapors which freely escape from the uncovered meat.

As a development in this field of invention, I endeavored to properly cook the meat without turning it during the cooking operation, thereby effecting a further saving in time, labor and fuel, and also conserving the flavors which escape when the rectifier is removed from the meat. Briefly stated, I have accomplished these results through the medium of a rectifying presser having a meat-engaging bottom face adapted to contact with the top surface of the hot meat, said rectifying presser being made of transparent material to provide an inspection window through which the hot meat is exposed during the cooking operation. A person will very readily become familiar with the varying colors of the meat exposed through this window, and thus determine just when the meat is properly cooked. The transparent rectifying member is preferably provided with a handle for use in applying it to the meat, and in lifting it from the cooked meat, but it is not necessary to remove this transparent rectifier during the cooking process.

A separate and distinct feature of the invention appears in a specific arrangement of grooves or channels for the circulation of hot moisture and vapors over the top surface of the meat, as will be hereafter described.

With the foregoing and other objects in view, the invention comprises the novel construction, combination and arrangement of parts hereinafter more specifically described and shown in the accompanying drawing, which illustrates one form of the invention. However, it is to be understood that the invention comprehends changes, variations and modifications within the scope of the claims hereunto appended.

Figure 1:
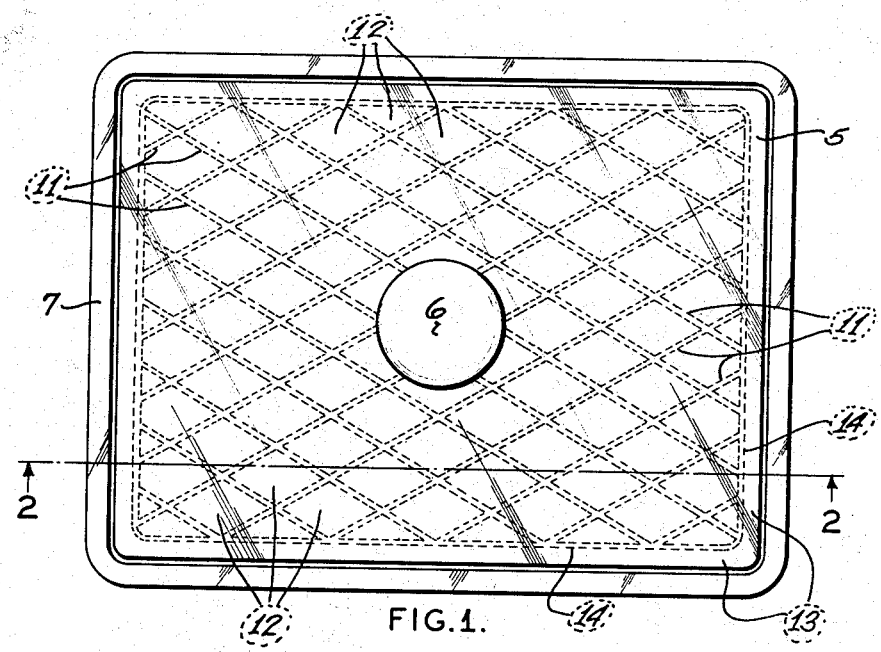
Fig. 1 is a top view of a meat rectifier embodying features of this invention.
Figure 2:
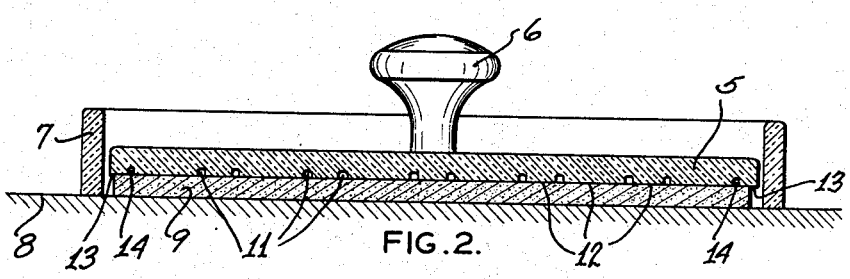
Fig. 2 is a section on the line 2—2 in Fig. 1.
Figures 3, 4:
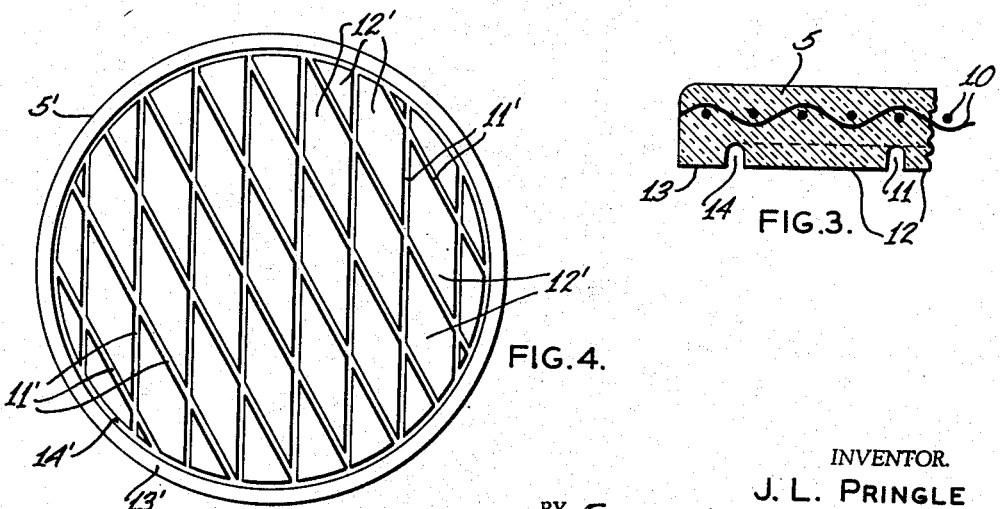
Fig. 3 is an enlarged fragmentary section showing a marginal portion of the rectifying member.
Fig. 4 is a bottom view of another form of the meat rectifier.

The device shown in Figures 1, 2 and 3 comprises a rectifying presser in the form of an approximately flat rectangular plate 5 having a meat-engaging bottom face to contact with the top surface of the meat, and a handle 6 extending from the top of said plate, so as to lie entirely above its meat-engaging face.

The rectifying device may be used in cooking meat on a hot plate, frying pan, or any other suitable support. The rectifying member may be confined by the upstanding marginal wall of an ordinary frying pan, or it may be confined within a suitable frame 7, movably seated on a hot plate 8, said frame having a continuous upright wall surrounding and located adjacent to the rectifying member. The device produced by this simple surrounding wall is open at the bottom to receive the meat, and open at the top to receive the rectifying presser. If desired, this surrounding wall may be made of transparent heat-resisting material to more completely expose the meat 9 between the hot plate 8 and the rectifying presser 5. A wall of this kind will cooperate with the rectifying presser 5 in confining the vapors and juices issuing from the hot meat.

However, when used either with or without a surrounding wall, the rectifying presser is free to constantly exert the pressure of its own weight upon the meat, so as to serve as a closure in preventing free escape of hot moisture and vapors from the top surface of the meat. The pressure of the rectifying member tends to retain the meat in a desirable flat condition, thereby forcing the bottom face of the meat onto the top surface of the hot plate 8, or other cooking utensil, so as to prevent free escape of vapors and hot moisture from said bottom face of the meat.

Prior to this invention, time and labor have been involved in turning meat during the cooking process, but the rectifying presser herein disclosed is preferably made of transparent material to produce an inspection window through which the hot meat is exposed during the cooking operation. As previously indicated, this inspection window enables the user to observe the varying colors of the meat, and thereby determine just when the meat is properly cooked, without removing the rectifier and without turning the meat. The importance and value of this feature have been demonstrated by actual tests which show that it results in a further conservation of the flavor, as well as an additional saving in time and fuel, while eliminating the necessity of turning the meat.

In using the term "transparent" to describe this inspection window, I mean that it is not opaque, and that it is so transparent or translucent, that the user can observe the condition of the meat confined beneath the rectifying presser. This device can be conveniently made of heat-resisting glass, and if desired, the glass can be provided with reinforcing wires 10 located within and surrounded by the glass, as shown in Fig. 3.

Another feature of the present invention appears in a means for confining the vapors and hot juices or other liquids at the top surface of the meat, so as to aid in cooking the upper portion of the meat, and also effect a further conservation of the flavor, as well as an improvement in the other advantages desired in this art. In one form of this feature, the bottom face of a meat rectifier is provided with grooves 11 as shown by dotted lines in Fig. 1 and full lines in Fig. 2 and Fig. 3. These grooves are conveniently formed in diagonal lines at different angles, so as to intersect each other at numerous points, thereby allowing the vapors and hot liquids to freely circulate in various directions over the top surface of the meat.

It will be observed that numerous meat-engaging members 12 having flat contact faces are formed between the grooves, and that said grooves terminate adjacent to the outer margin of the rectifier, so as to prevent free escape of the circulating moisture and vapors at said outer margin. In other words, the bottom face of the rectifier may be provided with a marginal abutment 13 extending downwardly around said grooves to form a stop or baffle for the fluids in the grooves. More specifically stated, a continuous marginal groove 14 may be formed in the bottom face of the rectifier. The continuous groove 14 surrounds all of the intersecting grooves 11. These grooves 11 preferably communicate with each other at the intersections and terminate in the surrounding groove 14, so the hot fluids are confined in the grooves but free to circulate over the top surface of the meat.

It is true that in some cases the continuous groove 14 and the surrounding abutment 13 will extend beyond the meat, but even under these conditions they will serve as surrounding baffles tending to retard or prevent free escape of the hot vapors and moisture. The hot vapors rise into the grooves and will tend to remain in the circulating system including the continuous surrounding groove 14.

Of course, the rectifying member itself serves as a baffle for the vapors and hot juices tending to rise from the top surface of the meat, but several important advantages are gained by allowing streams of these hot fluids to circulate over the meat. If the rectifying member is made of transparent material, the streams will obscure the portions of the meat beneath the grooves, but in this event, the device will include transparent meat-engaging members 12 contacting with the meat between the grooves, and the condition of the meat can be observed through these transparent members.

While the invention is not in any way limited to the specific dimensions of the meat rectifier, I will state that the transparent plate shown in Figures 1, 2 and 3 will be about $\tfrac{1}{8}$ of an inch thick, 5½ inches wide, and 7½ inches long. The grooves in the bottom of said plate may be $\tfrac{1}{8}$ of an inch wide and $\tfrac{3}{32}$ of an inch deep. The intersecting grooves 11 may be ⅝ of an inch apart, while the surrounding groove 14 is $\tfrac{1}{8}$ of an inch from the outer edge of the plate.

Fig. 4 illustrates a form of the invention wherein a circular rectifying member 5' is provided with intersecting grooves 11' surrounded by a marginal abutment 13', and a continuous groove 14' between said abutment and the grooves 11'. Meat-engaging members 12' are formed between the intersecting grooves 11'. This form may be used in an ordinary frying pan having an upstanding marginal wall surrounding the circular rectifier, or it may be used on a hot plate either with or without a surrounding wall. Various other modifications can be employed to obtain one or more of the several advantages herein set forth.

It will be observed that the rectifying presser prevents the usual curling, twisting or warping of the hot meat and that the cooked product will have a very desirable flat shape. Furthermore, the highly heated moisture and vapors confined in the circulating system at the bottom of the rectifier, aid in cooking the flat upper portion of the meat, so the new rectifier results in approximately uniform cooking throughout the confined body of meat. In addition to this improvement in proper cooking of the meat, the desired flavors are conserved and retained in the meat by the simple rectifying member which prevents free escape of meat juices, and all of these novel advantages in the quality and appearance of the cooked product are obtained while reducing the time of the cooking operation, economizing in the use of fuel, and avoiding the necessity of turning the meat.

I claim:

1. In a device for shaping and confining meat during cooking operations, a rectifying presser in the form of an approximately flat plate having a meat-engaging bottom face to contact with the top surface of the hot meat, and a transparent confining wall surrounding and located adjacent to the sides of said rectifying presser, said transparent confining wall being open at the bottom to receive the meat and open at the top to receive the rectifying presser, said rectifying presser being movable independently of said transparent confining wall so as to constantly exert the pressure of its own weight upon the meat and serve as a closure in preventing free escape of vapors from the top surface of the hot meat, while tending to retain the meat in a flat condition.

2. In a device for shaping and confining meat during cooking operations, a rectifying presser having a meat-engaging bottom face adapted to rest upon the top surface of the hot meat, said bottom face being provided with grooves for the circulation of vapors and hot moisture over the top of the meat, and meat-engaging members between said grooves, said grooves terminating in abutments at the outer margin of said bottom face to prevent free escape of the circulating vapors and moisture at said outer margin.

3. In a device for shaping and confining meat during cooking operations, a rectifying presser having a meat-engaging bottom face adapted to rest upon the top surface of the hot meat, said bottom face being provided with grooves for the circulation of vapors and hot moisture over the top of the meat, and meat-engaging members between said grooves, said bottom face also having a marginal abutment extending downwardly around said grooves and meat-engaging members to prevent free escape of the circulating vapors and moisture.

4. In a device for shaping and confining meat during cooking operations, a rectifying presser having a meat-engaging bottom face adapted to rest upon the top surface of the hot meat, said bottom face being provided with intersecting grooves for the circulation of vapors and hot moisture over the top of the meat, meat-engaging members between the grooves, said grooves being formed in diagonal lines at different angles, so as to intersect at numerous points between the meat-engaging members, and a continuous marginal groove surrounding and communicating with the first mentioned grooves to prevent free escape of the circulating vapors and moisture.

5. In a device for shaping and confining meat during cooking operations, a rectifying presser having a meat-engaging bottom face adapted to rest upon the top surface of the hot meat, said bottom face being provided with intersecting grooves for the circulation of vapors and hot moisture over the top of the meat, and meat-engaging members having flat contact faces between said grooves, said bottom face also having a continuous marginal abutment extending downwardly around said intersecting grooves, and a continuous marginal groove between said marginal abutment and the intersecting grooves, said continuous marginal groove being in communication with said intersecting grooves to receive the circulating vapors and moisture.

6. In a device for shaping and confining meat during cooking operations, a rectifying presser having a meat-engaging bottom face to contact with the top surface of the hot meat, said rectifying presser being free to constantly exert the pressure of its own weight upon the meat, so as to serve as a baffle for the vapors and hot moisture at the top surface of the hot meat, said rectifying presser being made of transparent material to provide an inspection window through which the hot meat is exposed during the cooking operation, the bottom of said transparent material being provided with intersecting grooves for the circulation of vapors and hot moisture over the top of the meat, and transparent meat-engaging members located between said intersecting grooves.

7. In a device for shaping and confining meat during cooking operations, a rectifying presser in the form of an approximately flat plate having a meat-engaging bottom face to contact with the top surface of the hot meat, a handle extending from the top of said rectifying presser, said rectifying presser being free to constantly exert the pressure of its own weight upon the meat, so as to serve as a baffle for the vapors and hot moisture at the top surface of the hot meat, said rectifying presser being made of transparent material to provide an inspection window through which the hot meat is exposed during the cooking operation, the bottom of said transparent material being provided with grooves for the circulation of vapors and hot moisture over the top of the meat, and transparent meat-engaging members having flat contact faces surrounded by said grooves.

JOHN L. PRINGLE.